Patented Sept. 10, 1940

2,214,251

UNITED STATES PATENT OFFICE 2,214,251

ANTIOXIDANT COMPOSITION

Harry F. Lewis, Appleton, Wis., assignor to The Institute of Paper Chemistry, Appleton, Wis., a corporation of Wisconsin No Drawing. Application December 14, 1938, Serial No. 245,678

5 Claims. (Cl. 44—9)

My invention relates to antioxidant compositions and more particularly to antioxidant compositions particularly adapted for use in stabilizing hydrocarbons of the type derived from petroleum.

Many compositions including synthetic products and so-called natural products have been suggested heretofore for use as oxidation inhibitors. A representative synthetic antioxidant considered to be one of the most potent on the market today is a compound known as p-monobenzyl-aminophenol. A representative natural antioxidant of value for use in anti-knock gasolines is a tar obtained in the destructive distillation of hardwood. While the antioxidants discovered by prior investigators have found wide use, the art has long recognized the need for a potent substantially non-toxic antioxidant of relatively low cost.

I have discovered that California redwood (i. e. the soft wood or conifer known as Sequoia sempervirens) is a potential source of a new antioxidant composition. I have also discovered that the antioxidant composition made up of tannins and related phlobaphenes can be readily extracted from the redwood. Ordinarily, I prefer to use an alcoholic solvent extracting medium using redwood flour made from redwood waste, e. g. sawdust, chips, slash and particularly the stumps and roots which contain an unusually high percentage of the desired redwood tannin composition.

My investigations have shown redwood to be unique as a wood in that it contains an unusually high percentage of extractives, e. g. up to 32 percent, of peculiar redwood tannin and phlobaphene compositions. The tannin may be extracted by means of an aqueous medium while the tannin and phlobaphene may be extracted by means of an alcoholic e. g. ethanol medium. The phlobaphene fraction may be separated from the tannin fraction if desired by addition of water as phlobaphenes are relatively insoluble in an aqueous medium. The phlobaphene fraction may also be separated from the tannin fraction utilizing other solubility differences between the two fractions. The solvents ordinarily employed being water, the alcohols, and the esters, etc. A preferred method for obtaining a purified antioxidant tannin of high activity comprises, extracting the tannin from a concentrated aqueous solution with ethyl acetate, extracting the tannin from the ethyl acetate solution with a dilute aqueous solution of sodium carbonate, precipitating the tannin contained in the sodium carbonate solution by addition of dilute acid, and redissolving the tannin precipitate in ethyl acetate. The solid products may be obtained in the usual manner by evaporation of the solvent. It will be understood that the suggested methods outlined above are merely illustrative and that the present invention is not limited thereto.

The antioxidant composition of the present invention consisting of redwood tannin with or without related redwood phlobaphenes is substantially non-toxic and is obtainable at a relatively low cost. Of great importance, the redwood extract has been found to be a particularly potent antioxidant, investigations showing the redwood extract, consisting essentially of redwood tannin, to possess in certain tests approximately twice the antioxidant value of p-mono-benzyl-aminophenol.

In carrying out comparative tests the following standard antioxidant test using mineral oil was employed: A sample of 75 grams of oil was heated to 134° C. in a constant temperature bath and oxygen passed through the oil at the rate of 10 liters per hour, the oxygen being dispersed by means of a fritted glass gas distributor. The breakdown or change in the nature of the oil is followed by determining the development of acidity or rate of acid formation in a given sample.

Hydrocarbons first pass through an induction period during which no acid is formed. The difference in the time required to produce acids depends primarily on the type of oil being tested, on the nature of the impurities present and on the amount and kind of inhibitors added. The mineral oil used in the tests shows a stop in its induction period at the end of about 1–1.5 hours. At the end of 2 hours treatment over 1 percent of the oil calculates to oleic acid.

The following table gives some representative results obtained following the standard antioxidant test outlined above.

TABLE

1. Mineral oil with no added antioxidant

| Hours of treatment | Percentage acid formation |
|---|---|
| 0.5 | 0.0 |
| 1.0 | 0.16 |
| 1.5 | 0.51 |
| 2.0 | 1.33 |
| 2.5 | 2.94 |

2. Mineral oil with p-monobenzyl-aminophenol antioxidant

| Percent antioxidant | Induction period |
|---|---|
| | Hours |
| 0.00 | 1–1.5 |
| 0.001 | 6.5–7 |
| 0.00175 | 10.5–11 |
| 0.0035 | 17.5 |
| 0.01 | 55 |

3. Mineral oil with catechol antioxidant

| Percent antioxidant | Induction period |
|---|---|
| | Hours |
| 0.01 | 12.5 |

4. Mineral oil with purified redwood tannin antioxidant

| Percent antioxidant | Induction period |
|---|---|
| | Hours |
| 0.002 | 22.5 |

5. Mineral oil with redwood tannin antioxidant

| Percent antioxidant | Induction period |
|---|---|
| | Hours |
| 0.001 | 9 |
| 0.0005 | 4.75 |

In the table (1) shows that in a blank run made with mineral oil and no added antioxidant, that the oil starts to break down after approximately 1–1.5 hours treatment and that at the end of 2 hours treatment the oil contains over 1 percent of acid; (2) shows that in a run made with mineral oil and p-monobenzylaminophenol, that the induction period, i. e. the period in which no acids are formed, is extended by the addition of the inhibitor and further that the period is increased as the percentage of inhibitor is increased; (3) shows that in a run made with mineral oil and catechol (another typical prior art antioxidant), that the induction period is extended by the addition of the inhibitor; (4) shows that in a run made with mineral oil and purified redwood tannin, that the induction period is extended by the addition of the inhibitor, and (5) shows that in a run made with mineral oil and redwood tannin (ethyl acetate extract), that the induction period is also extended by the addition of the inhibitor and further that the period is increased as the percentage of inhibitor is increased. The percentages of antioxidant used in the above table show the p-monobenzyl-amino-phenol to have over 4 times the antioxidant value of catechol and the purified redwood tannin to have approximately 2 times the antioxidant value of p-monobenzyl-aminophenol when used with the particular mineral oil employed in the standard test.

The tannic acid of commerce is ordinarily obtained from sumac and oak galls. This material is related to pentadigallyol glucoside of glucose, and should not be confused with the antioxidant of the present invention. The redwood tannin, for example, has been found to be an entirely different composition, my investigations indicating the redwood tannin to be related to bis(3',4'-dihydroxy)-flavopinacol. Oxidation tests carried out with a high boiling paraffin oil employing 0.1 commercial tannic acid and 0.1 catechol show the induction periods to be extended to 5.5 hours and 694 hours, respectively. The tests show commercial tannic acid to possess an extremely low antioxidant value compared to antioxidants such as catechol, which in turn (as shown by the table) possesses a relatively low antioxidant value compared to redwood tannin antioxidant. Various checks and comparative tests have shown commercial tannic acid to be a relatively poor inhibitor and not to be in the same antioxidant class with the redwood tannin composition of the present invention.

I have also discovered that in addition to the redwood tannin composition per se, potent antioxidant compositions may be obtained by the destructive distillation of the alcoholic extract of redwood as well as by the destructive distillation of the redwood itself. The redwood tars obtained from the destructive distillation of redwood (soft wood) should not be confused with hardwood tars obtained from hardwood, nor with the tar from pine which contains no tannin of the bis(3',4'-dihydroxy) flavopinacol type.

In the destructive distillation of the redwood alcoholic extract which contains both the tannin and phlobaphene fractions, distillation is carried out in vacuum in order to keep down the temperature. The crude tar obtained is soluble in ether and possesses an antioxidant value approximating catechol. The phenolic fraction of the crude tar, i. e. the portion soluble in sodium hydroxide, possesses a greater antioxidant value than either the ether soluble tar or catechol, but is considerably below that of the redwood tannin.

The tar fractions obtained from the destructive distillation of the redwood itself possess varying antioxidant values depending upon the particular fraction of tar or tar oil tested. For example, certain fractions were found to possess about twice the antioxidant value of catechol while other fractions were found to possess an antioxidant value below that of catechol. In all instances the antioxidant values of the products of destructive distillation do not approach the extremely high antioxidant values obtained using redwood tannin. The products of destructive distillation are, however, economically important as they possess good antioxidant properties and are obtainable at a low cost.

The water soluble redwood tannin which has a tendency to gradually lose its water solubility during purification, is particularly adaptable for use in stabilizing petroleum hydrocarbons. The antioxidant potency of the redwood tannin together with the antioxidant potency of the related redwood phlobaphenes, also makes it possible to use very low percentages of the inhibitor, e. g. 0.1–0.005. Hydrocarbon compositions stabilized with small amounts of redwood tannin composition are substantially free from rancidity and yellowing caused by deterioration.

It will be understood that the present invention is not limited to the illustrative examples described above. All modifications including redwood tannin compositions and related redwood phlobaphene compositions possessing antioxidant properties coming within the spirit and scope of the invention are intended to be covered by the claims appended hereto.

I claim:

1. As an antioxidant, a composition consisting essentially of water soluble redwood tannin and related redwood phlobaphenes.

2. As a hydrocarbon oxidation inhibitor, redwood tannin extract obtained from the tree known as *Sequoia sempervirens*.

3. A stable composition comprising hydrocarbons containing a small amount of tannin obtained from redwood.

4. Hydrocarbons of the petroleum type containing between 0.1 to 0.0005 percent of redwood tannin composition.

5. A process for extending the induction period of hydrocarbons which comprises adding a small amount of redwood tannin to the hydrocarbons.

HARRY F. LEWIS.